United States Patent [19]

Smith

[11] Patent Number: 4,485,224

[45] Date of Patent: Nov. 27, 1984

[54] ACRYLAMIDE POLYMERIZATION

[75] Inventor: Robert A. Smith, Uniontown, Ohio

[73] Assignee: The Goodyear Tire & Rubber Company, Akron, Ohio

[21] Appl. No.: 528,819

[22] Filed: Sep. 2, 1983

[51] Int. Cl.$^3$ .............................. C08F 2/00; C08F 4/40; C08F 220/56

[52] U.S. Cl. .................................. 526/214; 526/225; 526/303.1

[58] Field of Search ............................... 526/214, 225

[56] References Cited

U.S. PATENT DOCUMENTS 2,028,091 1/1936 Jaeger ...................................... 8/127
2,510,008 5/1950 Britton et al. ........................ 526/214
4,299,975 11/1981 Asbeck et al. ....................... 526/214

Primary Examiner—Joseph L. Schofer
Assistant Examiner—Peter F. Kulkosky
Attorney, Agent, or Firm—Alvin T. Rockhill

[57] ABSTRACT

This invention discloses a process for the polymerization of acrylamide and for the copolymerization of acrylamide with other monomers. It employs molecular weight jumpers that greatly enhance the molecular weight of the polymer formed. These high molecular weight acrylamide polymers offer outstanding advantages as enhanced oil recovery injection water viscosifiers.

18 Claims, No Drawings

ACRYLAMIDE POLYMERIZATION

BACKGROUND OF THE INVENTION

After using conventional pumping techniques very large amounts of oil in a given reservoir remain unrecovered. In an attempt to recover this vast quantity of unpumped petroleum many enhanced oil recovery (EOR) techniques have been developed. The water flooding method is a very common EOR technique that has been in use for some time. Water flooding is a secondary oil recovery technique that is chiefly of importance when the natural production of a well has ceased—that is, when petroleum can no longer be pumped from the well economically using conventional pumping techniques. The term "secondary recovery" as used herein, refers to all petroleum recovery operations used in such areas when spontaneous production of the well can no longer be effected. It includes what is sometimes known in the industry as "tertiary recovery," which is a later stage which begins when the petroleum reservoir is substantially "flooded out" and a large amount of water may be produced before any oil is recovered. Thus, primary recovery is when a well spontaneously flows using conventional pumping techniques and secondary recovery begins when primary recovery is no longer feasible and continues for as long as there is any petroleum in the well which can be economically or feasibly removed.

The water flooding technique comprises injecting water into a petroleum deposit through at least one input well (injection well), thereby causing the petroleum to flow from that area for collection through at least one output well. In the simplest recovery method a number of wells are drilled on the circumference of a circle and a final well is drilled in the center. Water is then pumped into one or more of the wells, typically the ones on the circumference, under high pressure and forced through the petroleum-bearing formations, usually porous rock strata. The petroleum remaining in the strata is forced out by the oncoming water and removed through the output well, usually the one at the center of the circle. More typically an array of injection and production (output) wells are established over an oil field in a manner that will optimize this secondary recovery technique by taking into account the geological aspects of that particular field. Ideally, the water should displace 100 percent of the petroleum in the oil field. Even though water may pass through a deposit, the inherent incompatibility of oil and water, variation in reservoir rock, including permeability variation, faults and shale barriers may result in some regions of the reservoir rock being by-passed so that large oil bearing areas in the deposit remain untouched. This results in less than 100 percent of the residual oil in the reservoir being recovered. The ability of water, or any other fluid, to displace oil is related to that fluid's mobility ratio. Every fluid has a specific mobility in an oil deposit, which can be defined as the ease with which that fluid flows through a porous medium divided by the viscosity of that fluid. A mobility ratio is the ratio of the mobility of two fluids: for example, oil and water. If a fluid flows much more easily than oil through a reservoir, it will readily bypass oil deposits within the reservoir rather than pushing them toward producing wells. Thus, fluids with low mobility ratios are greatly preferred for enhanced oil recovery applications. Recovery by water flooding techniques is greatly facilitated if the mobility of the petroleum relative to the injection water is at a maximum. This is frequently accomplished by increasing the viscosity of the aqueous medium and decreasing the visocisity of the petroleum, by the addition of suitable chemical agents. Thus, a thickener is ordinarily added to the water while a thinning agent may be charged into the petroleum.

High molecular weight (above about 1,000,000) water soluble polymers are generally added to the injection water used in EOR applications to improve the mobility ratio of the water to the oil. A very large increase in water viscosity can be obtained when certain polymers are added in minor amounts (100 ppm to 1500 ppm). Two general types of polymers are currently being used as injection water viscosifiers, they are polyacrylamides and polysaccharides. In general, partially hydrolyzed and anionic polyacrylamides are used, but cationic polyacrylamides have also been used in a limited number of cases. The mobility ratio improvement obtained using polyacrylamides decreases with water salinity and divalent ion concentration. Therefore, a fresh water source (total dissolved solids less than 10,000 ppm) has traditionally been necessary for the effective use of polyacrylamides in EOR applications as viscosifiers. The environment into which the polyacrylamide solution is injected has traditionally also been required to be substantially free of salts in order to be effective.

SUMMARY OF THE INVENTION

This invention reveals a process for the synthesis of ultra-high molecular weight polyacrylamide. This ultra-high molecular weight polyacrylamide has excellent properties as an injection water viscosifier for EOR applications. Even though polyacrylamide synthesized by utilizing the process of this invention is sensitive to metal salts its viscosity in aqueous solutions is sufficient to allow for its use in salty environments (in the presence of brine). Such ultra-high molecular weight polyacrylamide is also of great value in environments that are substantially free of salts since its ability to viscosify water per unit weight is greater than polyacrylamide of lesser molecular weight.

The process of this invention is also applicable in copolymerizations of acrylamide with other vinyl monomers. For example, in some cases it is desirable to copolymerize acrylamide with a metal salt of 2-acrylamido-2-methyl propane sulfonic acid (AMPS) in order to make the polymer being synthesized more resistant to hydrolysis (decomposition by reaction with water).

This invention more specifically discloses a process for the homopolymerization of acrylamide and for the copolymerization of acrylamide with vinyl monomers; comprising: initiating said homopolymerization or said copolymerization with a redox system and carrying out said homopolymerization or said copolymerization in an aqueous reaction medium in the presence of a molecular weight jumper of the structural formula:

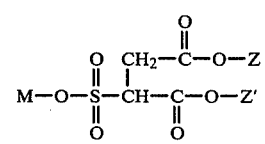

wherein M represents a member selected from the group consisting of Na, K, and NH$_4$; and wherein Z and Z' can be the same or different and represent a member selected from the group consisting of Na, K, NH$_4$, alkyl groups containing from 10 to 40 carbon atoms, aryl groups containing from 10 to 40 carbon atoms, alkyl-ether groups containing from 10 to 40 carbon atoms, and aryl-ether groups containing from 10 to 40 carbon atoms.

DETAILED DESCRIPTION

Ultra-high molecular weight polyacrylamide and acrylamide copolymers can be synthesized in an aqueous medium or in a water-in-oil dispersion utilizing the process of the invention. Polyacrylamide has the structural formula:

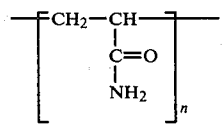

wherein n is an integer. Acrylamide copolymers are polymers that contain at least about 40 percent by weight acrylamide repeat units (repeat units which are derived from acrylamide). The remaining repeat units in acrylamide copolymers are vinyl monomer repeat units (repeat units which are derived from vinyl monomers other than acrylamide). These repeat units differ from the vinyl monomers that they were derived from in that their vinyl carbon-carbon double bond has been consumed in the polymerization. For example, if N,N-dimethylacrylamide is copolymerized with acrylamide the N,N-dimethacrylamide repeat units will have the structural formula:

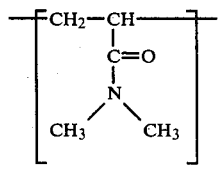

and the resulting acrylamide/N,N-dimethylacrylamide copolymer produced will have the structural formula:

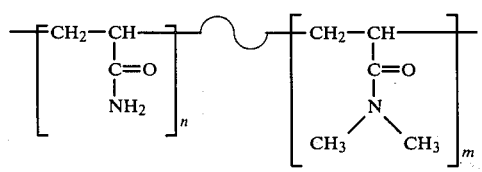

wherein n and m are integers and wherein ⌒ indicates that the distribution of repeat units derived from acrylamide and N,N-dimethylacrylamide can be random.

The vinyl monomers that can be employed in copolymerizations with acrylamide must contain at least one vinyl group (CH$_2$=CH—). These vinyl monomers generally contain from 2 to 16 carbon atoms. Such vinyl monomers can also contain nitrogen, oxygen, halogens, sodium, calcium, and potassium. The maximum amount of a vinyl monomer that can be copolymerized with acrylamide to produce a useful polymer will vary greatly. A person skilled in the art will be able to ascertain this amount through routine experimentation. Generally, such acrylamide copolymers will contain no more than about 50 percent by weight vinyl monomer repeat units. In some cases the amount of vinyl monomer repeat units that it is desirable to incorporate into the polymer will be less than 5 percent by weight, based upon the total repeat units in the polymer. In many cases vinyl monomers can be polymerized into acrylamide copolymers without necessarily improving or adversely affecting the properties of the polymer produced. Alpha-olefins and lightly halogenated α-olefins containing from 2 to 16 carbon atoms are examples of such vinyl monomers that do not greatly affect the properties of the polymer produced when they are co-polymerized with acrylamide in small quantities. Since aliphatic vinyl monomers have a low solubility in water it generally will not be possible to polymerize large quantities of such monomers into the acrylamide copolymers of this invention by employing an aqueous polymerization system without utilizing soaps.

Vinyl monomers with the structural formula:

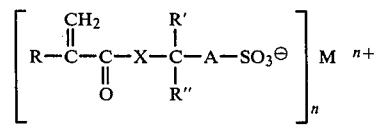

wherein R, R', R" can be the same or different and represent a hydrogen atom, a methyl group, or an ethyl group; wherein X represents —NH— or —O—; wherein A represents an alkylene group containing from 1 to 4 carbon atoms; wherein M represents Na, K, Ca, or NH$_4$; and wherein n is 1 or 2, are the preferred vinyl monomers for the copolymerizations of this invention. If M is Na, K, or NH$_4$, then n will be 1 and if M is Ca, then n will be 2. Repeat units derived from vinyl monomers of this type tend to make the copolymer produced more resistant to hydrolysis. It is generally preferred for R to be an hydrogen atom or a methyl group. The alkylene group (represented as A) can be a straight chain or branched.

A representative example of a straight chain alkylene group is shown in the following structural formula:

A representative example of a branched chain alkylene group is shown in the following structural formula:

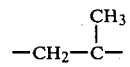

The most preferred vinyl monomers for copolymerization into acrylamide copolymers are metal and ammonium salts of 2-acrylamido-2-methylpropane sulfonic acid (AMPS). Copolymers of this type have a very high viscosity in fresh water, maintain excellent viscosities in saline solutions and are resistant to hydrolysis. Sodium AMPS (sodium 2-acrylamido-2-methylpropanesulfonate), potassium AMPS (potassium 2-acrylamido-2-methylpropanesulfonate), ammonium AMPS (ammonium 2-acrylamido-2-methylpropanesulfonate) and calcium AMPS (calcium 2-acrylamido-2-methylpropanesulfonate) are all useful as monomers in the synthesis of ultra-high molecular weight acrylamide copolymers.

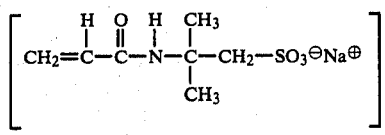

Sodium 2-acrylamido-2-methylpropanesulfonate

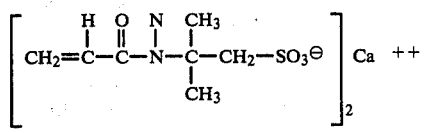

Calcium 2-acrylamido-2-methylpropanesulfonate

The aqueous polymerizations of this invention are carried out in an aqueous reaction medium comprising: water, monomers, a redox initiator system, and a molecular weight jumper.

Ultra-high molecular weight polyacrylamide and acrylamide copolymers can be synthesized in an aqueous medium over a very wide temperature range (from about $-20°$ C. to about $40°$ C.). The monomer charge concentration used in an aqueous solution synthesis of polyacrylamide and acrylamide copolymers can be varied over a wide range from as low as about 2 weight percent to as high as about 60 weight percent of the total reaction medium (monomers, water, initiators, molecular weight jumper, etc.). Generally, it is preferred to use a monomer charge concentration (total concentration of all monomers in the aqueous reaction medium) in the range of 15 to 55 weight percent. For example, 80 parts of water, 19 parts of acrylamide and 1 part of sodium AMPS (20 weight percent monomer charge concentration) can be employed in the polymerization recipe utilized in the synthesis of ultra-high molecular weight copolymers of acrylamide and sodium AMPS.

The amount of metal or ammonium AMPS useful in such copolymerizations can range from as low as 0.01 weight percent to as high as 50 weight percent of the total monomer charge. In such copolymerizations generally from 5 weight percent to 20 weight percent of a metal or ammonium AMPS will be employed based upon the total monomer charge if a copolymer which is resistant to hydrolysis is desired.

The ultra-high molecular weights that are attained by practicing the process of this invention are achieved through the use of molecular weight jumpers. These molecular weight jumpers must be present in the reaction medium during the course of the polymerization.

The molecular weight jumpers that are useful in the practice of this invention have the structural formula:

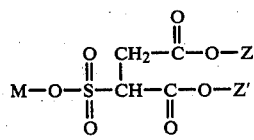

wherein M represents a member selected from the group consisting of Na, K, and NH4; and wherein Z and Z' can be the same or different and represent a member selected from the group consisting of Na, K, NH4, alkyl groups containing from 10 to 40 carbon atoms, aryl groups containing from 10 to 40 carbon atoms, alkyl-ether groups containing from 10 to 40 carbon atoms, and aryl-ether groups containing from 10 to 40 carbon atoms. In most cases wherein Z is Na, K, or NH4; Z' will be an alkyl group, an aryl group, an alkyl-ether group or an aryl-ether group. In the converse situation wherein Z' is Na, K, or NH4 normally Z will be an alkyl group, an aryl group, an alkyl-ether group or an aryl-ether group. These molecular weight jumpers are generally prepared by reacting maleic anhydride with an appropriate alcohol containing at least 10 carbon atoms followed by the addition of a metal bisulfite, such as sodium bisulfite. A general description of this synthesis technique is given in U.S. Pat. Nos. 2,028,091 and 2,176,423 which are incorporated herein by references in their entirety.

Alkyl-ether groups are aliphatic hydrocarbon radicals that contain one or more "oxy" linkages (—O—). Some representative examples of alkyl-ether groups include:

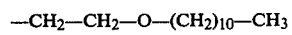

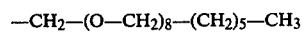

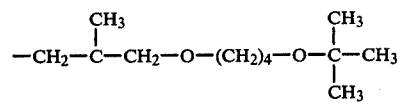

Aryl-ether groups are aromatic hydrocarbon radicals that contain one or more "oxy" linkages (—O—). The term alkyl group as used herein includes what is sometimes referred to as a cycloalkyl group. In other words the term alkyl group as used herein includes all aliphatic hydrocarbon radicals including those with straight chain branched chain, and cyclic (ring) structures. The aryl groups normally employed contain an aliphatic component and are sometimes referred to as aralkyl groups.

The preferred molecular weight jumpers for use in this invention are those wherein Z and Z' are selected from the group consisting of Na; K; NH4; alkyl groups containing from 12 to 30 carbon atoms; alkyl-ether groups of the structural formula:

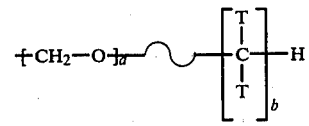

wherein T and T' can be the same or different and represent a hydrogen atom, a methyl group, or an ethyl group, wherein a and b are integers, wherein ⁓ indicates that the distribution of repeat units can be in any order, and wherein the alkyl-ether group contains from 12 to 30 carbon atoms; aryl-ether groups of the structural formula:

-continued

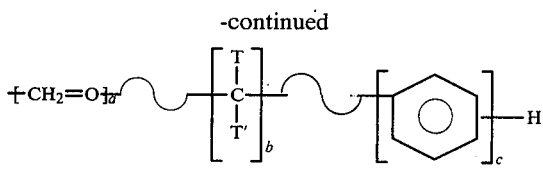

wherein T and T' can be the same or different and represent a hydrogen atom, a methyl group, or an ethyl group, wherein a, b, and c are integers, wherein $\sim\sim$ indicates that the distribution of repeat units can be in any order, wherein chain linkages through the benzene ring can be in an ortho, meta, or para orientation, and wherein the aryl-ether group contains from 12 to 30 carbon atoms.

In the most preferred molecular weight jumpers for use in this invention Z' is Na or K and Z is an alkyl group containing from 12 to 15 carbon atoms or an aryl-ether group with the structural formula:

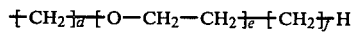

wherein d is an integer from 1 to 6, wherein e is an integer from 2 to 10, and wherein f is an integer from 1 to 20, and wherein the sum of d, e, and f (d+e+f) is from 12 to 24. Some representative examples of molecular weight jumpers that are most preferred for use in this invention include: Aerosol ™ A-102 (sold by American Cyanamid) which has the structural formula:

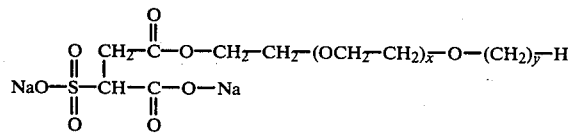

wherein x is 4 or 5 and wherein y is 10 to 12; and bis-n-tridecyl sodium sulfosuccinate which has the structural formula:

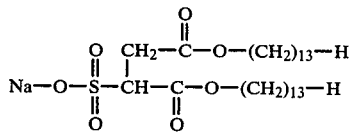

The polymerizations of this invention can be carried out in an aqueous reaction medium to obtain ultra-high molecular weight polyacrylamide and acrylamide copolymers. These polymerizations can be initiated by the addition of a redox system to a mixture of water, the monomers, and the molecular weight jumper which forms an aqueous reaction medium. It is not necessary for the molecular weight jumper to be present at the time that the polymerization is first initiated (it can be added later), but it is generally desirable for the molecular weight jumper to the present from the start of the polymerization.

Numerous redox initiator systems can be employed to initiate the polymerizations of this invention. For example, the polymerizations of this invention can be initiated by utilizing metal persulfate/sodium metabisulfite redox initiators, $Cu^{2+}$/peroxydiphosphate redox initiators, $KMnO_4$/glucose redox initiators, and $Cu^{3+}$/hydroperoxide redox initiators. Ferrous sulfate heptahydrate, $FeSO_4.7H_2O$, has also been used in conjunction with paramenthane hydroperoxide as a redox initiation system in the polymerizations of this invention. Potassium persulfate and ammonium persulfate can be used with great success as redox initiators when used in conjunction with sodium metabisulfite. Various metal persulfates (for example sodium and potassium) and ammonium persulfate (hereinafter the term metal persulfates will be meant to include ammonium persulfate) can be employed as redox initiators when used in conjunction with sodium metabisulfite, sodium thiosulfate, and sodium dithionite. These redox initiator components can be employed at levels from about 0.0001 weight percent to about 0.05 weight percent based upon the total weight of the aqueous reaction medium. It is generally preferred for the initiator components to be employed at levels from about 0.0005 weight percent to 0.01 weight percent based upon the total weight of the aqueous reaction medium. The most preferred level for the initiator components is from 0.001 weight percent to 0.005 weight percent based upon the total aqueous reaction medium. Optimal results are obtained a concentration of about 0.002 weight percent of each of the redox initiating components (based upon the total weight of the aqueous reaction medium) in homopolymerizations of acrylamide and in copolymerizations containing large amounts of acrylamide in comparison to other monomers.

The temperature range over which the polymerizations of this invention can be conducted is from about $-20°$ C. to about 40° C. The preferred temperature range is from $-5°$ C. to 20° C. with the most preferred temperature being from $-2°$ C. to 5° C. The reaction time allowed for the polymerization to occur (time period between the initiation of the polymerization and its termination) is generally in the range of about 0.5 to 18 hours. However, in most cases a reaction time of 1.5 to 3 hours can be employed. This reaction time will vary with the temperature at which the polymerization is conducted with the type of redox initiator system employed and with the level of initiator used.

It is sometimes desirable to use deionized water in the preparation of the aqueous reaction medium used in the polymerizations of this invention. For best results oxygen which is dissolved in the water and monomers should be removed before polymerization. This can be accomplished by sparging the monomers and water used in the reaction medium with an inert gas or nitrogen.

The amount of molecular weight jumper that can be employed in the aqueous reaction media of this invention will generally range from about 2 weight percent to about 20 weight percent based on the total weight of the reaction medium. Lesser amounts of molecular weight jumper can be used, but by employing less than 2 percent by weight of the molecular jumper in a reaction medium only minimal increases in the molecular weight of the polyacrylamide or acrylamide copolymer being synthesized will result. On the other hand, greater amounts (20 weight percent) of molecular weight jumper can also be employed, but such use of addtional molecular weight jumper generally does not result in molecular weights that are greater than those observed when more moderate amounts of molecular weight jumper is used. In other words, a molecular weight maximum is reached and the use of additional amounts of molecular weight jumper will not result in significant increases in molecular weight above this maximum. The molecular weight maximum is generally reached at a molecular weight jumper level in the reaction media of 8 to 12 phm (parts per 100 parts of monomer by weight).

The preferred amount of molecular weight jumper for use in the aqueous reaction media of this invention ranges from 4 weight percent to 15 weight percent. The most preferred amount of molecular weight jumper for use in the reaction media of this invention ranges from 10 weight percent to 12 weight percent based upon the total weight of the reaction media.

These aqueous polymerizations which yield ultra-high molecular weight polyacrylamide and acrylamide copolymers result in the formation of a water soluble gel-like mass. This water soluble polymer must be dissolved in additional water in order to be utilized as a viscosifier for EOR applications. These polymers should be dissolved in an appropriate amount of water to provide a polymer concentration that will result in the desired visocisity for the injection water. Obviously the viscosity of the injection water increases with increasing polymer concentrations. Generally it will be desirable to have an injection water visocisity (Brrokfield) of about 2 to about 30 cP (centipoise) for EOR applications.

When preparing these solutions care should be taken so as to prevent shear forces from causing molecular fracture in the polymer chains of these polymers. In order to prevent molecular fracture when dissolving these polymers in water vigorously mixing, shaking, etc. should generally be avoided. The occurrence of such molecular fracture induced by shearing forces can significantly reduce the molecular weight of the polymer and therefore its usefulness as an EOR viscosifier (viscosities would be reduced). In order to dissolve these polymers in water they must be allowed to dissolve over a very long period of time. Ultra-high molecular weight acrylamide copolymers and ultra-high molecular weight polyacrylamide are very valuable as EOR injection water viscosifiers since their ultra-high molecular weight allows them to viscosify an aqueous solution to a given viscosity at lower polymer concentrations than do corresponding acrylamide polymers of lesser molecular weight. The ability of an EOR polymer to viscosify water increases with increasing molecular weight; therefore, the molecular weight jumpers of this invention are very valuable because they can be used to increase the molecular weight of polyacrylamide and acrylamide copolymers.

The polyacrylamide and acrylamide copolymers of this invention can also be synthesized in an aqueous reaction medium utilizing water-in-oil dispersion polymerization techniques. The ultra-high molecular weight polymers produced in an aqueous reaction media by water-in-oil dispersion polymerization techniques are in the form of a liquid (in contrast to the gel-like mass formed in standard aqueous polymerizations). This liquid can easily be further diluted to the desired polymer concentration for use as injection water for EOR applications. This further dilution can be achieved almost immediately upon mixing with additional water. The ultimate properties of the acrylamide copolymers and polyacrylamide produced by water-in-oil dispersion polymerizations are equivalent to the properties of their counterparts produced by standard aqueous polymerization (they have the same excellent properties as EOR viscosifiers). Water-in-oil dispersion polymerization offers a very substantial advantage over standard aqueous polymerization in that the ultra-high molecular weight polymers produced can be easily and rapidly dissolved (further diluted) in the injection water.

The water-in-oil dispersion synthesis of polyacrylamide and acrylamide copolymers is run utilizing the same monomer charge composition, redox initiators, and reaction conditions as is used in the standard aqueous polymerization synthesis of these ultra-high molecular weight polymers. In water-in-oil dispersion polymerization in addition to the reagents used in standard aqueous polymerizations, there is also present an oil and normally a dispersing agent. Some representative examples of oils that can be used are kerosene, diesel fuel, pentane, hexane, decane, pentadecane, benzene, toluene, 2,4-dimethylhexane, mineral oil (liquid petrolatum), and 3-ethyloctane. This is certainly not an exhaustive list of the oils that can be employed. Most alkanes containing 5 or more carbon atoms will work very well as will most aromatic hydrocarbons. Alkanes should not be used since they can react in the polymerization. The dispersing agents are nonionic surfactants that are soluble in hydrocarbons and insoluble in water. Some representative examples of dispersing agents that may be used in water-in-oil dispersion polymerization include polyethers, such as Igepal CO-430 TM (GAF Corp.); polyglycerol oleates, such as Witconol-14 TM (Witco Chemical Company); and polyglycerol stearates, such as Witconol-18L TM (Witco Chemical Company).

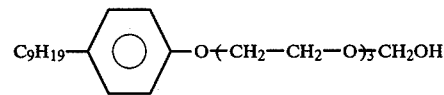

Igepal CO-430 TM

These dispersing agents (nonionic surfactants) are added to the oil that will be used in the water-in-oil dispersion polymerization. Normally, the oil used in such dispersion polymerizations will contain from about 2 to about 10 weight percent of the dispersing agent. Normally, the aqueous reaction medium used in these water-in-oil dispersion polymerizations will contain 25 weight percent of the oil containing the dispersing agent based on the total aqueous reaction medium. Even more oil can be used in such water-in-oil dispersion polymerization with a corresponding increase in the amount of dispersing agent used but generally it will not be advantageous to use larger amounts of the oil. Good results can be obtained using an aqueous reaction medium comprising about 25 weight percent monomers, about 50 weight percent water, and about 25 weight percent oil. A charge composition containing less than 25 weight percent monomers can be used, however, it will not normally be advantageous to use lesser quantities of the monomers.

It is often desirable to use deionized water in such water-in-oil dispersion polymerizations. Oxygen which is dissolved in the monomers, water, and oil should be removed before polymerization. This can be accomplished by sparging the monomers, water, and oil with an inert gas or nitrogen. Such a mixture of monomers, water, and oil is vigorously mixed to obtain the waterin-oil dispersion. The dispersion is brought to the desired temperature (normally about 0° C.) and the initiator components are added. The aqueous reaction medium containing the redox initiators system is normally stirred or in some alternative way agitated during the course of the polymerization.

After the desired reaction time the polymerization can be terminated by adding a shortstopping agent, such as methylether hydroquinone; however, this will normally not be necessary. Normally, this reaction time will be from about 1.5 to about 3 hours. The desired reaction time will vary with reaction temperature, initiator concentration, and the degree of polymerization desired. Normally, it will be desirable to allow the polymerization to go to completion (until the monomer supply is essentially exhausted).

In the polymerizations of this invention yields are essentially quantitative (in excess of 99 percent). The percentage of repeat units by weight derived from a monomer in a polymer will be equal to the percentage by weight of that monomer in the aqueous reaction medium used in the synthesis of that polymer.

The present invention will be described in more detail in the following examples. These examples are merely for the purpose of illustration and are not to be regarded as limiting the scope of the invention or the manner in which it may be practiced. Unless specifically indicated otherwise, all parts and percentages are given by weight.

EXAMPLES 1 THROUGH 10

A series of 10 vials were charged with 50 percent aqueous acrylamide solutions. These acrylamide monomer solutions were degassed by a continuous nitrogen sparge. Three different molecular weight jumpers were deaerated under aspirator vacuum for a minimum of 3 hours.

Table I indicates which molecular weight jumper was added to each of the vials and the amount of it employed. Examples 1, 5, and 9 served as controls wherein no molecular weight jumper was added. In the examples wherein a molecular weight jumper was added, it was charged into the vial under a nitrogen atmosphere just after cessation of sparging and immediately before addition of the redox initiator system.

These polymerizations were initiated by injecting equivalent amounts of sodium meta-bisulfite, $Na_2S_2O_5$, and ammonium persulfate, $(NH_4)_2S_2O_8$, into each of the vials. In these examples 0.01 percent of sodium meta-bisulfite and 0.01 percent of ammonium persulfate, based upon the total weight of the aqueous reaction medium, was added to each of the vials. All of these polymerizations were conducted with the vials being immersed in an ice water bath for a period of at least 12 hours. These polymerizations resulted in the production of polymer cements.

Aqueous brine solutions having a polymer concentration of 2500 ppm (parts per million) were prepared by placing the proper amount of polymer cement from each of the vials in 400 ml (milliliters) of brine water and waiting for complete dissolution which took several days. One-hundred percent monomer conversion was assumed in the preparation of these solutions. The brine water solutions employed in these examples contained 3 percent NaCl and 0.3 percent $CaCl_2$. Brookfield viscosities were then determined for each of the polymer-brine solutions with the results being given in Table I.

TABLE I

| Example | M W Jumper[a] | M W Jumper Level (phm)[b] | Brookfield Viscosity (cP)[c] |
|---|---|---|---|
| 1 | Aerosol TM A-102 | 0 | 4.5 |
| 2 | Aerosol TM A-102 | 0.8 | 5.6 |
| 3 | Aerosol TM A-102 | 2.0 | 8.3 |
| 4 | Aerosol TM A-102 | 10.0 | 20.5 |
| 5 | Aerosol TM A-103 | 0 | 7.5 |
| 6 | Aerosol TM A-103 | 0.8 | 8.5 |
| 7 | Aerosol TM A-103 | 2.0 | 20.5 |
| 8 | Aerosol TM A-103 | 10.0 | 19.5 |
| 9 | TR-70[d] | 0 | 6.2 |
| 10 | TR-70 | 2 | 16.3 |

[a] M W Jumper = Molecular Weight Jumper
[b] phm = parts per one-hundred parts monomer
[c] cP = centipoise
[d] TR-70 = bis-n-tridecyl sodium sulfosuccinate Aerosol TM A-103 has the structural formula:

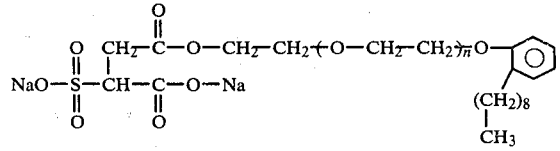

wherein n is 8 or 9.

The very dramatic effect that the molecular weight jumpers of this invention have on molecular weight is apparent when Examples 1, 5 and 9 which were controls and did not contain any molecular weight jumper are compared with the examples wherein a molecular weight jumper was present during the polymerization. Actually in these examples Brookfield viscosities were determined instead of molecular weights. However, Brookfield viscosities are of perhaps greater importance in the characterization of an EOR polymer than is molecular weight. In any case, increases in Brookfield viscosities are indicative of increases in the molecular weight of the polymer in the solution being tested.

The presence of Aerosol TM A-102 during the homopolymerization of acrylamide resulted in more than quadrupling the Brookfield viscosity of the brine solution prepared from the polyacrylamide produced (compare Example 1 with Example 4). It should be noted that these Brookfield viscosities were run under very harsh conditions since they were conducted with the polyacrylamide being dissolved in brine. The presence of brine severely reduces the viscosity of aqueous polyacrylamide solution. If these Brookfield viscosities would have been run in pure water they would have been substantially higher. However, such a brine solution simulates the harsh conditions often encountered in actual EOR applications.

EXAMPLES 11 through 16

The procedure specified in Examples 1 through 10 was employed in these examples except that a copolymerization of acrylamide monomer with sodium AMPS was conducted which was initiated with $Na_2S_2O_5$ and $(NH_4)_2S_2O_8$ at a level of 0.002 weight percent each based upon the total weight of the aqueous reaction medium. The aqueous reaction mediums employed in these polymerizations contained an acrylamide monomer concentration of 3.5M (molar) and a sodium AMPS concentration of 0.5M. Aerosol TM A-202 was used as the molecular weight jumper in these experiments and was employed at the level shown in Table II, which is expressed as a volume percent based upon the total aqueous reaction medium. The Brookfield viscosities shown in Table II were determined in a brine solution using the technique specified in Examples 1 through 10. The very dramatic effect that Aerosol ™ A-102 has on the molecular weight can readily be seen by analyzing Table II. It is apparent that this molecular weight jumper increases Brookfield viscosities very substantially. At a concentration of 5 volume percent in the aqueous reaction medium the Brookfield viscosity attained was almost 8 fold what is was when the polymerization was done in the absence of a molecular weight jumper (compare Example 11 with Example 15).

TABLE II

| Example | M W Jumper Level (Volume %) | Brookfield Viscosity (cP) |
|---------|------------------------------|---------------------------|
| 11 | 0 | 3.4 |
| 12 | 1 | 5.9 |
| 13 | 2 | 6.6 |
| 14 | 3 | 9.7 |
| 15 | 5 | 26.2 |
| 16 | 10 | 24.9 |

While certain representative embodiments and details have been shown for the purpose of illustrating the invention, it will be apparent to those skilled in this art that various changes and modifications may be made therein without departing from the scope of the invention.

What is claimed is:

1. A process for the homopolymerization of acrylamide and for the copolymerization of acrylamide with vinyl monomers to produce water soluble homo- or copolymers; comprising: initiating said homopolymerization or said copolymerization with a redox system and carrying out said homopolymerization or said copolymerization to produce a high molecular weight polymer with said high molecular weight being above about 1,000,000 in an aqueous reaction medium at a temperature of from about $-20°$ C. to about $40°$ C. in the presence of from about 2 weight percent to about 20 weight percent, based on the total weight of the reaction medium, of a molecular weight jumper of the structural formula:

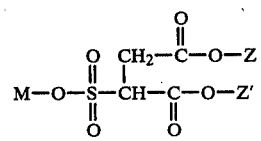

wherein M represents a member selected from the group consisting of Na, K, and NH$_4$; and wherein Z and Z' can be the same or different and represent a member selected from the group consisting of Na, K, NH$_4$, alkyl groups containing from 12 to 30 carbon atoms, alkyl-ether groups of the structural formula:

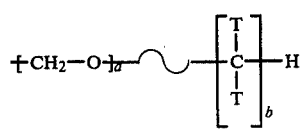

wherein T and T' can be the same or different and represent a hydrogen atom, a methyl group, or an ethyl group, wherein a and b are integers, wherein ⁓ indicates that the distribution of repeat units can be in any order, and wherein the alkyl-ether group contains from 12 to 30 carbon atoms; aryl-ether groups of the structural formula:

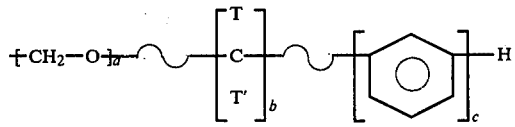

wherein T and T' can be the same or different and represent a hydrogen atom, a methyl group, or an ethyl group, wherein a, b, and c are integers, wherein ⁓ indicates that the distribution of repeat units can be in any order, wherein chain linkages through the benzene ring can be in an ortho, meta, or para orientation, and wherein the aryl-ether group contains from 12 to 30 carbon atoms.

2. A process as specified in claim 1 wherein Z is selected from the group consisting of Na, K, and NH$_4$ and wherein Z' is selected from alkyl groups, alkyl-ether groups and aryl-ether groups.

3. A process as specified in claim 1 wherein Z' is selected from alkyl groups, alkyl-ether groups and aryl-ether groups and Z is selected from the group consisting of Na, K, and NH$_4$.

4. A process as specified in claim 1 wherein Z' is selected from the group consisting of Na and K, and wherein Z is an alkyl group containing from 12 to 15 carbon atoms or an aryl-ether group with the structural formula:

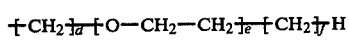

wherein d is an integer from 1 to 6, wherein e is an integer from 2 to 10, and wherein f is an integer from 1 to 20, and wherein the sum of d, e, and f (d+e+f) is from 12 to 24.

5. A process as specified in claim 1 wherein Z and Z' are alkyl groups containing from 12 to 30 carbon atoms.

6. A process as specified in claim 5 wherein Z and Z' are alkyl groups containing from 12 to 15 carbon atoms.

7. A process as specified in claim 1 wherein said molecular weight jumper has the structural formula

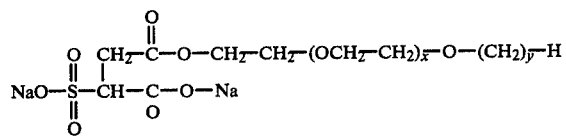

wherein x is 4 or 5 and wherein y is 10 to 12.

8. A process as specified in claim 1 wherein said molecular weight jumper has the structural formula

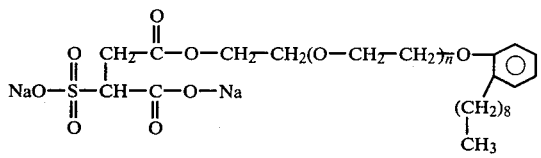

wherein n is 8 or 9.

9. A process as specified in claim 1 wherein said molecular weight jumper is bis-n-tridecyl sodium sulfosuccinate.

10. A process as specified in claim 1 wherein said vinyl monomers have the structural formula:

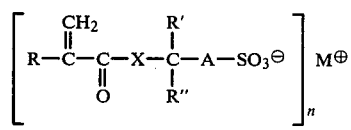

wherein R, R', R" can be the same or different and represent a hydrogen atom, a methyl group, or an ethyl group; wherein X represents —NH— or —O—; wherein A represents an alkylene group containing from 1 to 4 carbon atoms; wherein M represents Na, K, Ca, or NH$_4$ with the proviso that if M is Na, K, or NH$_4$, then n will be 1 and if M is Ca, then n will be 2.

11. A process as specified in claim 10 wherein R is a hydrogen atom or methyl group.

12. A process as specified in claim 11 wherein said vinyl monomers are selected from the group consisting of sodium 2-acrylamido-2-methylpropanesulfonate, potassium 2-acrylamido-2-methylpropanesulfonate, ammonium 2-acrylamido-2-methylpropanesulfonate and calcium 2-acrylamido-2-methylpropanesulfonate).

13. A process as specified in claim 1 wherein said redox system employs a methyl persulfate in conjunction with at least one member selected from the group consisting of sodium metabisulfite, sodium thiosulfate, and sodium dithionate.

14. A process as specified in claim 1 wherein said molecular weight jumper is present in said reaction medium at a concentration ranging from 4 weight percent to 15 weight percent based upon the total weight of said reaction medium.

15. A process as specified in claim 4, wherein said reaction medium is at a temperature of from −5° C. to 20° C. and wherein said molecular weight jumper is present in said reaction medium at a concentration ranging from 4 weight percent to 15 weight percent.

16. A process as specified in claim 15, wherein said vinyl monomers are selected from the group consisting of sodium 2-acrylamido-2-methylpropanesulfonate, potassium 2-acrylamido-2-methylpropanesulfonate, ammonium 2-acrylamido-2-methylpropane-sulfonate and calcium 2-acrylamido-2-methylpropanesulfonate.

17. A process as specified in claim 16 wherein said redox system employs a methyl persulfate in conjunction with at least one member selected from the group consisting of sodium metabisulfite, sodium thiosulfate, and sodium dithionite.

18. A process as specified in claim 17 wherein Z and Z' are alkyl groups containing from 12 to 15 carbon atoms, wherein M is Na, and wherein said molecular weight jumper is present in said reaction medium at a concentration ranging from 10 weight percent to 12 weight percent based upon the total weight of said reaction medium.

* * * * *